Nov. 30, 1943.  H. HAVEMANN ET AL  2,335,511
PROCESS FOR THE PURIFICATION OF TRIALKYL AND TRIARYL PHOSPHATES
Filed June 11, 1940
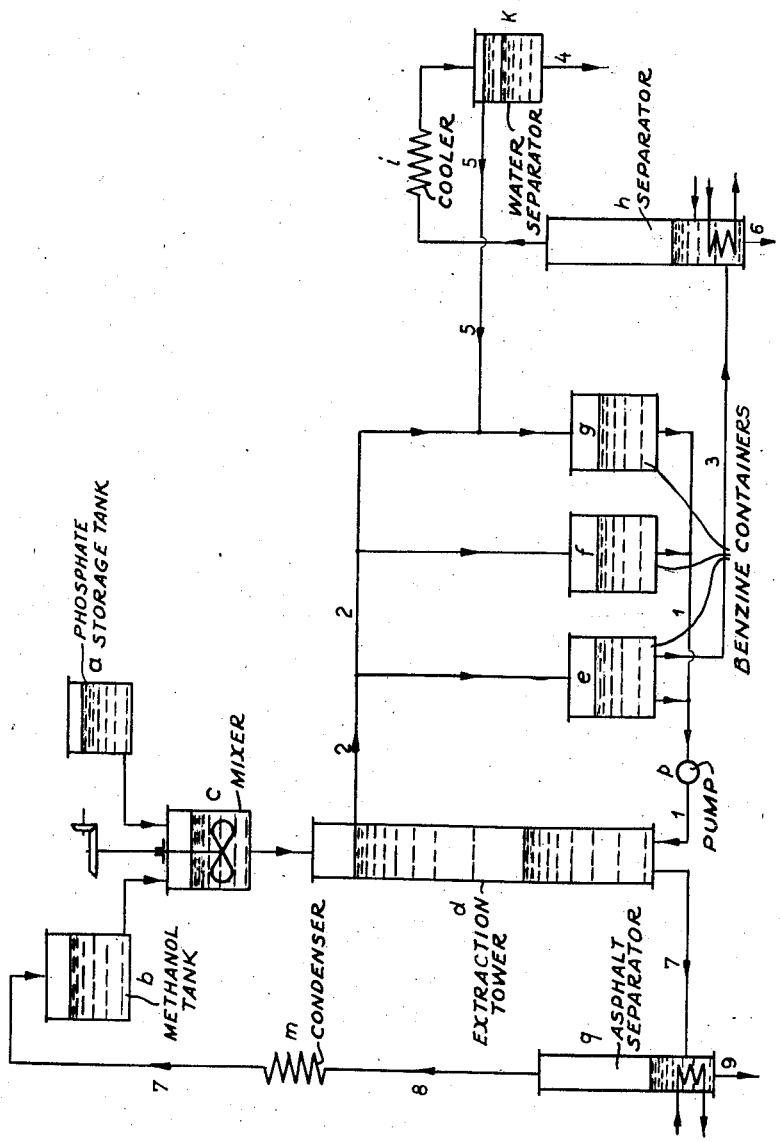
Hinrich Havemann
Kurt Weichert
INVENTORS
BY
THEIR ATTORNEYS Patented Nov. 30, 1943

2,335,511

UNITED STATES PATENT OFFICE 2,335,511

PROCESS FOR THE PURIFICATION OF TRI-ALKYL AND TRIARYL PHOSPHATES

Hinrich Havemann and Kurt Weichert, Leuna, Germany; vested in the Alien Property Custodian Application June 11, 1940, Serial No. 339,872
In Germany June 12, 1939

6 Claims. (Cl. 260—461)

The present invention relates to a process for the purification of trialkyl and triaryl phosphates.

For the dephenolization of waste aqueous liquors containing phenolic bodies, especially of waste liquors obtained in the treatment of brown coal, for example by low temperature carbonization or hydrogenation, trialkyl and triarylphosphates, especially tricresylphosphate, are increasingly used as extraction agents. But the said waste liquors contain, besides phenols and neutral oils, other substances, in particular organic compounds of a higher molecular weight which are absorbed by the extraction agents during the extraction. During the extraction and the working up of the extracts, these accompanying substances are transformed by polymerization, condensation or resinification into asphaltic substances of still higher molecular weight which are retained in the extraction agent upon the separation of the phenols from the phosphoric esters by distillation. They not only increase the viscosity of the extraction agent, but also give rise to emulsions between the extraction agent and the water to be dephenolized with consequent heavy loss in the valuable extraction agent.

It is therefore essential that the impure trialkyl- or triarylphosphates are continuously or intermittently purified. With this object in view they are treated with oleum, the resulting precipitate being filtered or centrifuged off. The impure trialkyl- or triarylphosphates may also be dissolved in a suitable solvent, for example benzene, carbon tetrachloride and the like, and from this solution the contaminations may be precipitated in a solid form by means of a suitable precipitant, for example sufficient quantities of aliphatic hydrocarbons. But here, too, extraction agent will be lost for the reason that parts thereof are occluded by the impurities precipitated from the solution. Besides, this method of working is complicated since the solvent and the precipitant must afterwards be separated by fractional distillation.

An alternative method consists in treating the impure trialkyl- or triarylphosphate with a solvent which with the trialkyl- or triarylphosphate forms a homogeneous mixture, but does not dissolve or but slightly dissolves the asphaltic impurities. The mechanical separation of the asphaltic substances which remain undissolved in the presence of the said solvents, by filtration or centrifuging, however, constitutes a time-taking and tedious operation; besides, the separation is not complete as the solid substances always adsorb comparatively large quantities of the ester. Since the said trialkyl- and triarylphosphates, especially the tricresylphosphate, are valuable substances it is advisable from an economical point of view that they should be recovered from the solid undissolved substances, which makes an additional operation necessary for working them up.

We have now found that tricresylphosphate or other triarylphosphates as well as trialkylphosphates may be freed from any contaminations still contained therein after removing phenols, which avoids any of the disadvantages above referred to, by treating them with a solvent capable of dissolving the trialkyl- or triarylphosphate together as well as the impurities contained therein, and extracting from the solution the trialkyl- or triarylphosphate by means of a solvent which is immiscible with the said solvent and does not dissolve the asphaltic impurities. By distilling off the solvent from the different layers the pure trialkyl- or triarylphosphate and the asphaltic impurities may be recovered separately. Or, the trialkyl- or triarylphosphate containing impurities may be treated with the two kinds of solvent simultaneously, the trialkyl- or triarylphosphate being contained partly in the solvent for the esters alone, partly in the solvent for both the esters and impurities, from which it may be extracted with the further amounts of solvent which does not dissolve the impurities.

The group of solvents which dissolve both the impurities and the trialkyl- or triarylphosphates comprises aliphatic alcohols of low-molecular weight, as methanol and ethanol, which contain small percentages of water, while the group of solvents which are immiscible with these solvents and do not dissolve the impurities chiefly comprises saturated aliphatic hydrocarbons of low molecular weight, such as benzine consisting wholly or mainly of such hydrocarbons. These hydrocarbons practically only dissolve the trialkyl- and triarylphosphates. Since the solubility of the asphaltic impurities in these hydrocarbons which is small in itself is the lesser the lower the molecular weight is of the said hydrocarbons, it may be of advantage to employ hydrocarbons which are gaseous at ordinary temperature, for example propane. The operation must then, of course, be carried out under such pressures under which the said hydrocarbons are in the liquid state.

When extracting the solution of the impure trialkyl- or triarylphosphate in alcohol containing a slight percentage of water with benzine in a cyclic system, the benzine may be continuously distilled from the extract in a fractionating column and again used for the extraction of the alcoholic solution. More advantageously, however, the alcoholic solution is first extracted with a benzine which has been repeatedly used for extractions and thereby enriched in trialkyl- or triarylphosphate, then in stages with benzines poorer in trialkyl- or triarylphosphate and ultimately with pure benzine, whereupon only the extracts saturated with trialkyl- or triarylphosphate are worked up.

The present invention will be further described with reference to the accompanying drawing which shows diagrammatically an equipment in which the process according to the present invention may be carried out.

Impure tricresylphosphate supplied from the store tank $a$ and methanol containing a slight percentage of water supplied from tank $b$ are intimately mixed in container $c$. The extraction tower $d$ which is provided with filler bodies is then charged with about one third of its volume of the said mixture. For extracting the tricresylphosphate from this mixture there is used first a benzine from a previous operation which already contains tricresylphosphate. This benzine is supplied from container $e$ through line 1 by means of pump $p$ to the extraction tower $d$ from below. In the said tower the benzine passes through the tricresylphosphate-methanol solution in as fine as possible a distribution, collects on top of the solution and flows back into container $e$ through line 2. The benzine is pumped in a cycle until it is saturated with tricresylphosphate. It then passes through line 3 into the separator $h$, wherein the benzine is expelled by means of steam through indirect heat-exchange. The benzine vapours are condensed in a cooler $i$. Any remnants of benzine still contained in the tricrysylphosphate are expelled by distillation with steam. The mixture of steam and benzine vapours leaving the separator $h$ are likewise condensed in the cooler $i$. In the container $k$ the condensed benzine is separated from water. Through line 5 the benzine flows back into the container $g$ for pure benzine, while the water is withdrawn through line 4. From the bottom of the separator $h$ the purified tricresylphosphate is withdrawn through pipe 6.

For the second stage of extraction a benzine which already contains some tricresylphosphate in the dissolved state is supplied from the store tank $f$ to the extraction tower through line 1 by means of pump $p$, whence it passes to tank $e$ through line 2. The benzine is pumped though until tricresylphosphate is practically no longer absorbed by it, whereupon it may be used again in the first stage of the extraction of a fresh solution of tricresylphosphate and methanol from tank $e$.

The third stage of extraction is carried out with pure benzine, which flows from tank $g$ to the extraction tower $d$ through line 1 and back to tank $f$ through line 2, treatment being continued until the tricresylphosphate is completely removed from the methanol. The said benzine is then used for the treatment of another solution of tricresylphosphate in methanol in the second stage of extraction.

After the third stage of extraction the methanol contained in tower $d$ no longer contains tricresylphosphate, but only asphaltic impurities. It is passed from the extraction tower $d$ to the separator $q$ through line 7, where the methanol is driven off. The methanol is returned to the storage tank $b$ by way of the condenser $m$.

The asphaltic residue left in the separator $q$ is heated to liquefy it and then withdrawn at the bottom of the equipment through pipe 9.

By the process in accordance with the present invention a tricresylphosphate is obtained which is completely free from asphaltic impurities, while the asphaltic impurities are completely free from occluded tricresylphosphate. Tricresylphosphate is thus purified in a simple manner and practically without waste. The same applies to the purification of other triarylphosphates used for the dephenolization of waste liquors as well as to the purification of trialkylphosphates.

The following example serves to illustrate how the present invention may be carried out in practice, but the invention is not restricted to the said example.

*Example*

A tricresylphosphate containing 15 per cent of asphaltic impurities, which had bee.. used for the dephenolization of waste liquors, obtained in the destructive hydrogenation of coal or oil, is mixed in an apparatus according to the accompanying drawing, with five times its volume of methanol containing about 2 per cent of water and extracted from the said mixture with forty times its volume of benzine in 3 stages. The tricresylphosphate which is thereby recovered practically without waste, is completely free from asphaltic impurities and these impurities are separated with practically no tricresylphosphate occluded therein.

What we claim is:

1. A process for the elimination of asphaltic impurities from phosphoric acid esters selected from the group consisting of triaryl phosphates and trialkyl phosphates used for the extraction of phenols from waste aqueous liquors and freed from the phenols but containing asphaltic impurities, which process comprises treating said phosphates simultaneously with two agents A and B, agent A consisting of low molecular aliphatic alcohols and a small amount of water, agent B consisting of low molecular saturated aliphatic hydrocarbons, separating the latter and the materials dissolved therein from the other materials and recovering the phosphoric acid esters by distilling off the low molecular aliphatic hydrocarbons from the separated portion.

2. The process as claimed in claim 1, wherein agent A consists of methanol and a small amount of water.

3. The process as claimed in claim 1, wherein the agent B is benzine.

4. A process for the elimination of asphaltic impurities from phosphoric esters selected from the group consisting of triaryl phosphates and trialkyl phosphates used for the extraction of phenols from waste aqueous liquors and freed from the phenols but containing asphaltic impurities, which process comprises dissolving said impure phosphates in a solvent consisting of low molecular aliphatic alcohols and a small amount of water and extracting from the solution thus obtained the phosphates free of said impurities in stages with a solvent consisting of low molecular saturated aliphatic hydrocarbons, using in the first stages solvent used for a previous extraction and in the last stage pure solvent and recovering the phosphoric acid esters by distilling off the solvent from the extract obtained in the first extraction stage.

5. A process for the purification of phosphoric esters selected from the group consisting of triaryl phosphates and trialkyl phosphates used for the extraction of phenols from waste aqueous liquors and freed from the phenols but containing asphaltic impurities, which process comprises dissolving said impure phosphates in methanol containing a small amount of water, extracting from the solution thus obtained the phosphates free of said impurities with a solvent consisting of low molecular saturated aliphatic hydrocarbons, and separating the solvent from the extract.

6. A process for the purification of tricresyl phosphate used for the extraction of phenols from waste aqueous liquors and freed from the phenols but containing asphaltic impurities, which process comprises dissolving said impure phosphates in methanol containing about 2% water, extracting from the solution thus obtained the tricresyl phosphate free from impurities in stages with benzine, using in the first stages benzine used in a previous stage and in the last stage pure benzine, and separating the benzine from the extract of the first stage by distillation.

HINRICH HAVEMANN.
KURT WEICHERT.